United States Patent Office 2,706,411
Patented Apr. 19, 1955

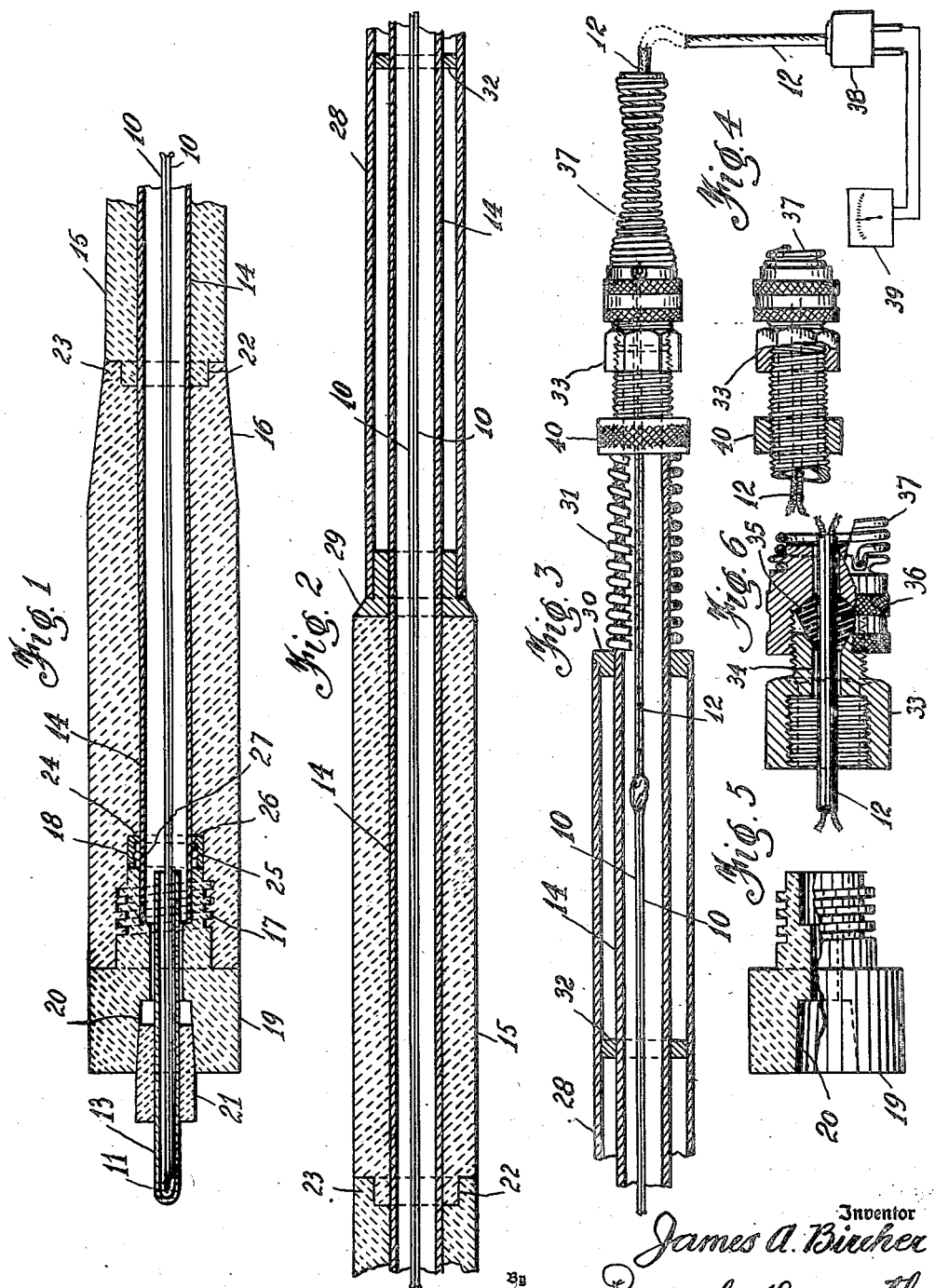

2,706,411

THERMOELECTRIC DEVICE FOR MEASURING HIGH TEMPERATURES

James A. Bircher, Pittsburgh, Pa.

Application December 30, 1952, Serial No. 328,743

8 Claims. (Cl. 73—359)

This invention relates to temperature measurement and particularly to a novel thermoelectric device adapted for use in high temperature furnace atmospheres and bath of molten metal.

There are several ways in which the temperature of furnace interiors and molten metal baths may be measured. The three most used and most practical methods of making such temperaturate measurements are 1, by measuring the electromotive force generated by the junction of two dissimilar metals immersed in the heated zone, 2, by means of the radiated light through an optical pyrometer and 3, by means of the radiated heat energy through a radiation pyrometer. Of these methods the first is the simplest and most accurate but the fact that the junction of the two metals must be immersed directly into the zone whose temperature is being determined, limited to a considerable extent its application. For example, the thermocouple wires cannot be, themselves, directly inserted into the molten bath of metal, nor can they be directly inserted into a corrosive furnace atmosphere unless a couple made of noble metals is used and the atmosphere is not sufficiently high to melt them.

It has heretofore been proposed to insert the thermocouple into a refractory tube and immerse the tube in a molten bath, for example, by passing the tube through a hole in the roof or in the side wall of the furnace into the molten bath. The difficulty with this practice was that the tube was quickly corroded by the action of the metal and furnace gases at the metal-gas interface.

An object of the invention herewith presented is to provide a thermoelectric device for temperature measurement which eliminates the aforesaid difficulties of prior art devices and provides a long-lived, portable temperature measuring device which is easily and quickly repaired.

Another object of the invention is to provide a thermoelectric temperature measuring device in which all parts are quickly and easily interchanged with similar parts of like design.

A further object of the invention is to provide a light weight, one operator device for temperature measurement.

Another object is to provide a thermoelectric temperature measuring device which can be used in corrosive furnace atmospheres and in molten metal baths.

Another object is to provide a thermoelectric temperature measuring device having a junction of dissimilar metal wires sealed from the atmosphere and protected by a refractory sheath in such manner as to not materially affect its sensitivity to temperature change.

In a preferred embodiment of the invention there is provided a pair of parallel dissimilar wires having a junction at one end. A thin walled refractory sheath surrounds the junction. A tubular metal sheath surrounds the two wires from a point adjacent the junction to their opposite extremities and preferably extends beyond. Refractory members are provided around the metal sheath from the end adjacent the junction to a point intermediate the ends of the metal sheaths. Locking means is provided between the refractory member adjacent the junction and the end of the metal sheath to prevent the refractory members from separating from the sheath. Preferably this refractory member is larger in diameter than the remainder of the refractory members and has a tapered shoulder at one end forming with the next adjacent member a smooth unbroken line. A threaded refractory member surrounding and frictionally engaging the thin walled refractory sheath threadingly engages the refractory member surrounding the metal sheath to form with it continuous refractory seal about the end of the wires and the metal sheath. A metal sleeve surrounds the end of the metal sheath remote from the junction and is preferably spaced from it by spacing rings forming a plurality of chambers between it and the metal sheath. One end of this sleeve engages the end of the refractory members and the other end engages resilient means connected to the end of the metal sheath whereby pressure is constantly exerted on the sleeve and on the refractory members. A pair of electrical leads are connected to the ends of the wires opposite the junction and to a means for measuring current flow. Resilient means are provided around the leads to seal them in the end of the tubular sheath whereby the passage of atmospheric gases into the sheath is prevented.

While certain of the important features of the invention have been described a more complete understanding of this invention may be had by referring to the accompanying drawings in which:

Figure 1 is a section at the junction end of the thermoelectric device of this invention.

Figure 2 is a section intermediate the ends of the device of Figure 1.

Figure 3 is a section at the end of the device opposite the junction end shown in Figure 1.

Figure 4 is an elevational view partly in section showing the end opposite the junction.

Figure 5 is an enlarged view partly in section of the threaded refractory member.

Figure 6 is an enlarged section of the end opposite the junction showing the sealing means between the leads and the metal sheath.

Referring to the drawings there is illustrated a pair of parallel dissimilar metal wires 10 connected together at one end to form a thermojunction 11. The opposite ends of the wires are connected to a pair of rubber covered leads 12. A thin walled refractory sheath 13 surrounds the junction 11 and extends a short distance along the dissimilar wires 10. A tubular metal sheath 14 surrounds the end of the sheath 13 and extends beyond the ends of the two dissimilar wires 10 to a point intermediate the ends of the rubber covered leads 12. Surrounding the metal sheath 14 is a plurality of cylindrical refractory members 15 extending from a point adjacent the center of the refractory sheath 13 to a point intermediate the ends of the metal sheath 14. The refractory member 15 adjacent the refractory sheath 13 is larger in diameter than the remaining members and is provided at one end with a tapered shoulder 16 to form an unbroken line with the remaining member, and at the opposite end with an enlarged threaded bore 17 adapted to receive a locking ring 18 and a refractory member 19 which surrounds the refractory sheath 13. The refractory member 19 is threaded and is provided with a tapered bore 20 which frictionally engages a refractory sealing member 21 surrounding and engaging the refractory sheath 13. Each of the refractory members 15 is provided with an interlocking male portion 22 and female portion 23 so as to form a tight sealing connection between each member. The locking ring 18 is provided with a flange 24 along one edge which engages the metal sheath and with an indentation 25 receiving balls 26 which enter into a similar indentation 27 in the metal sheath 14 thereby locking the ring in place to prevent the refractory member 15 from sliding on the sheath. An outer metal sleeve 28 surrounds the end of the metal sheath 14 which extends beyond the refractory members 15. One end of this sleeve 28 bears on a bearing and spacing ring 29 which abuts the refractory member 15 furthest from the junction 11. The opposite end of the sleeve 28 abuts a second bearing and spacing ring 30 against which a spring 31 exerts pressure to maintain the refractory members in sealing engagement. Intermediate spacing rings 32 are provided intermediate the ends of the sleeve 28 between it and the metal sheath 14. A knurled adjusting nut 40 serves to apply proper tension to spring 31 and a threaded metal cap 33 fits on the end of the metal sheath 14 remote from the junction 11. This cap 33 is provided with a hollow bore 34 through which the lead wires 12 pass. The outer end of this bore is tapered to receive a tapered resilient sealing member 35. A pressure ring 26 is threaded on the cap 33 into engagement with the sealing member 35 to compress it about the leads 12 to seal them in the cap 33. A spring protector 37 of usual form is fixed to the pressure ring 36 to prevent fraying and damage to the leads 12 as they leave the ring. A pronged fitting 38 is fixed to the ends of the lead wires to provide a convenient means for connecting to a current measuring device such as a galvanometer 39.

The advantages of the thermoelectric temperature measuring device of this invention are believed obvious. All of the refractory and metal parts are interchangeable with other units of similar design, thus reducing down time and maintenance cost.

While a preferred embodiment of this invention has been illustrated and described it may be otherwise embodied within the scope of the following claims.

I claim:

1. A thermoelectric device for measuring high temperatures comprising a pair of parallel dissimilar metal wires, a junction at one end of said wires, a thin walled refractory sheath surrounding the junction, a tubular metal sheath surrounding the two dissimilar wires from a point adjacent the end of the thin walled refractory sheath to a point beyond the end of the two dissimilar metals remote from their junction, interlocking refractory sleeves extending from the end of the metal sheath near the junction to a point intermediate the ends thereof, locking means between the metal sheath and the refractory sleeve adjacent the junction, a threaded refractory member surrounding the refractory sheath intermediate its ends and threadingly engaging the refractory sleeve adjacent the locking means on the thin walled refractory sheath frictionally engaging said threaded refractory member, a metal sleeve surrounding the tubular sheath fixedly engaging the refractory sleeve remote from the junction and extending to a point adjacent the end of the tubular metal sheath, resilient means fixed to the end of the tubular metal sheath acting on the end of the metal sleeve and cooperating with the locking means whereby the refractory sleeves and the metal sleeve are maintained in sealing contact under substantially constant pressure, a pair of electrical leads connected to the ends of the dissimilar wires opposite the junction and extending out of the metal sheath to a current indicating means and resilient sealing means between the tubular metal sheath and the electrical leads whereby the interior of the sheath is sealed against penetration of atmospheric gases.

2. A thermoelectric device as claimed in claim 1 in which the refractory sleeve adjacent the junction is of greater diameter than the remainder of said sleeves and is provided with a tapered shoulder at one end forming a continuous uninterrupted surface with the next adjacent sleeve and each said refractory sleeve is provided with interfitting male and female portions.

3. A thermoelectric device as claimed in claim 1 in which the electrical leads are covered with a resilient covering, a tapered resilient sealing member surrounds said covering at the end of tubular metal sheath and is forced into engagement with said covering by engagement between a pair of opposed tapered shoulders fixed to the ends of the sheath and movable toward one another.

4. A thermoelectric device as claimed in claim 1 in which the outer metal sleeve is spaced from the tubular metal sheath by spaced apart rings providing a plurality of hollow insulating spaces between the outer sleeve and the metal sheath.

5. A thermoelectric device as claimed in claim 1 in which the locking means between the refractory sleeve and the tubular metal sheath comprises an annular flange ring surrounding the sheath and in contact therewith at the edge of the flange, an indentation around the outer periphery of the sheath adjacent the junction end, a corresponding indentation in the inner wall of the annular ring and a plurality of spherical balls in said indentations preventing the movement of the ring on the sheath.

6. A thermoelectric device as claimed in claim 1 in which the threaded refractory member is provided with an axial bore and a tapered opening at the end thereof opposite the threaded portion and the thin walled refractory sheath is surrounded intermediate its ends by and in sealing engagement with a tapered refractory plug which frictionally engages the tapered opening in the threaded member.

7. A thermoelectric device for measuring high temperatures comprising a pair of parallel dissimilar metal wires, a junction at one end of said wires, a thin walled refractory sheath surrounding the junction, a tubular metal sheath surrounding the wires from a point adjacent the end of the thin walled refractory sheath to a point remote from the junction of the dissimilar wires, a plurality of refractory members surrounding the metal sheath and overlying said first mentioned point and sealing by engaging the thin walled refractory sheath, resilient means engaging the end of said metal sheath remote from the junction and bearing against the end of the refractory members remote from said junction, locking means between the metal sheath and the refractory members preventing their removal from one another and cooperating with the resilient means to maintain them under substantially constant pressure, a pair of electrical leads extending from the ends of the dissimilar wires opposite the junction to a means for measuring current flow and sealing means between the electrical leads and the tubular metal sheath whereby the interior of the sheath is sealed against penetration of atmospheric gases.

8. A thermoelectric device for measuring high temperatures as claimed in claim 7 in which the refractory members are of graphite.

References Cited in the file of this patent

UNITED STATES PATENTS

| | | |
|---|---|---|
| 1,660,504 | Grubb | Feb. 28, 1928 |
| 2,019,695 | Ross | Nov. 5, 1935 |
| 2,137,280 | Hartmann | Nov. 22, 1938 |
| 2,631,179 | Bell | Mar. 10, 1953 |
| 2,660,061 | Lewis | Nov. 24, 1953 |

OTHER REFERENCES

"Pyrometry," by Wood & Cork, McGraw-Hill Co., N. Y., 1927, pp. 182–183.